Aug. 4, 1964   G. L. SUNDQUIST ETAL   3,143,158
ENGINE POSITIONER AND SHAFT STRAIGHTENER
Filed Jan. 12, 1961   2 Sheets-Sheet 1
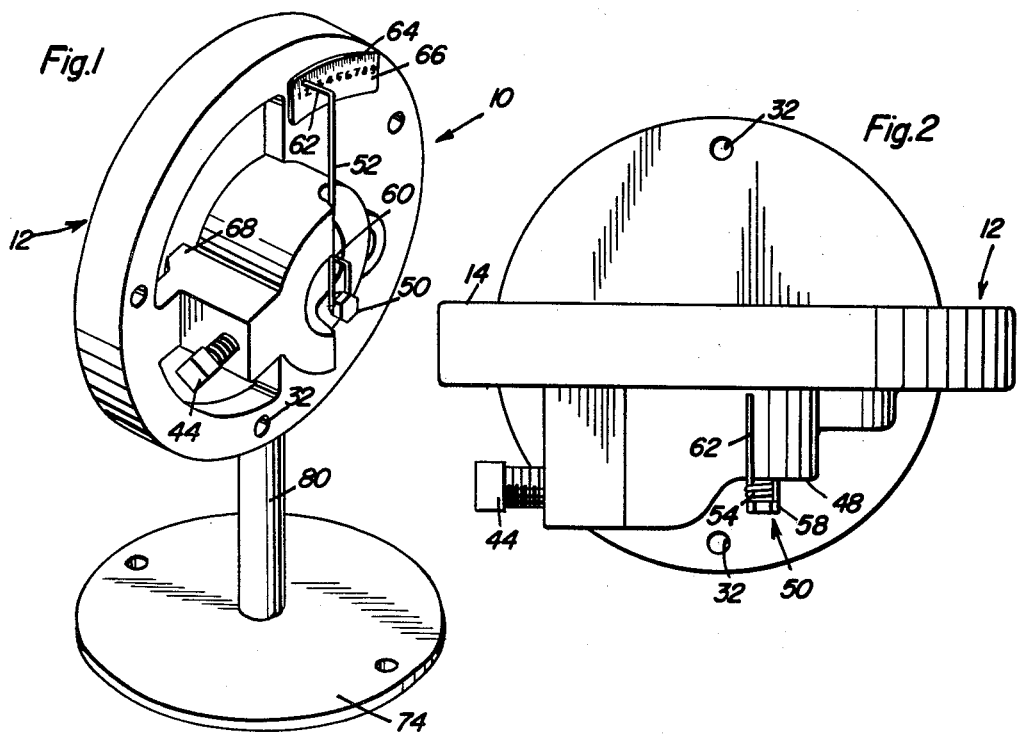
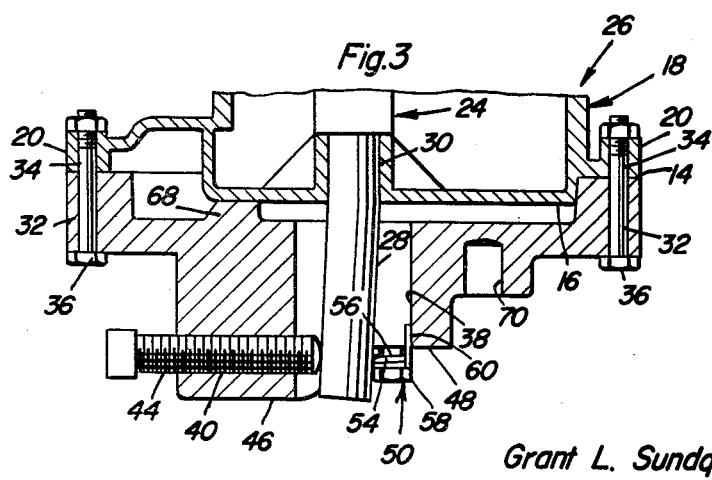
Grant L. Sundquist
Marlin R. Smith
INVENTORS Aug. 4, 1964    G. L. SUNDQUIST ETAL    3,143,158
ENGINE POSITIONER AND SHAFT STRAIGHTENER
Filed Jan. 12, 1961    2 Sheets-Sheet 2
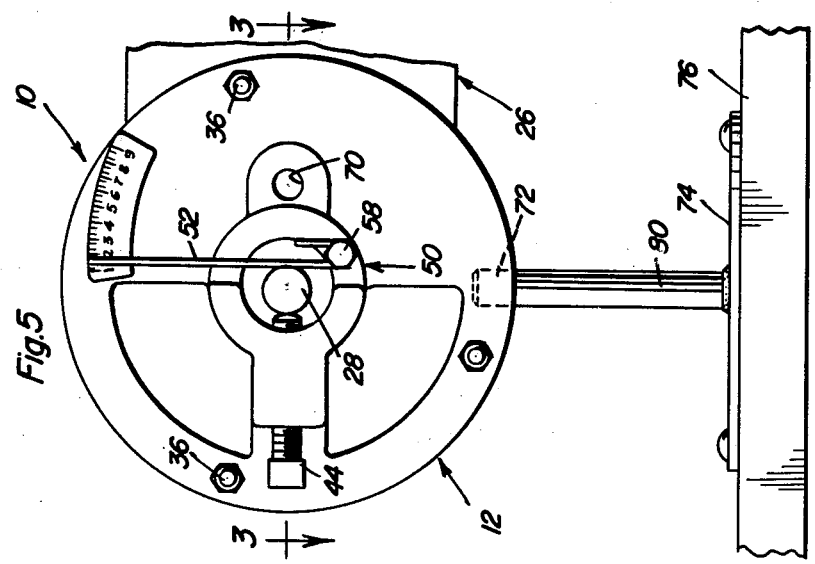
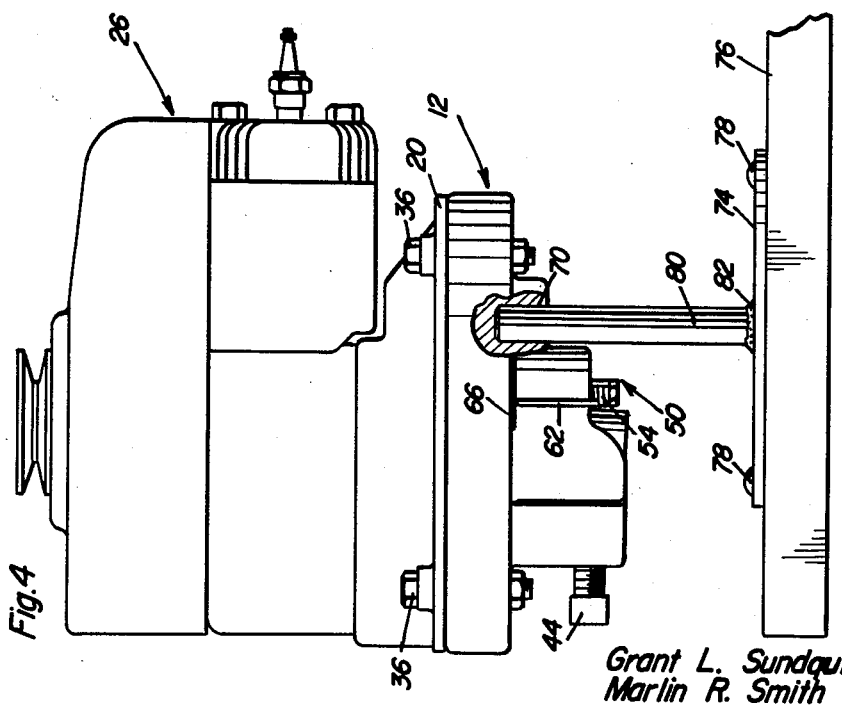
Grant L. Sundquist
Marlin R. Smith
INVENTORS

United States Patent Office 3,143,158
Patented Aug. 4, 1964

3,143,158
ENGINE POSITIONER AND SHAFT
STRAIGHTENER
Grant L. Sundquist, 413 N. Gill St., Monticello, Iowa, and
Marlin R. Smith, R.R. 1, Central City, Iowa
Filed Jan. 12, 1961, Ser. No. 82,234
2 Claims. (Cl. 153—32)

This invention relates to a novel and useful engine positioner and shaft straightener specifically adapted to facilitate the repair work performed on small internal combustion engines such as those utilized to power rotary lawn mowers.

Inasmuch as the smaller internal combustion engines utilized to power rotary lawn mowers and the like are relatively light, their weight alone is not sufficient to rigidly support the engine on a supporting surface while mechanical maintenance is being performed thereon such as would be the case with larger internal combustion engines of the type used in motor vehicles and the like. Accordingly, it is an object of this invention to provide an engine positioner which may be utilized to support relatively small internal combustion engines in positions in which they may be readily worked upon.

A further object of this invention, in accordance with the immediately preceding object, is to provide an engine positioner which will rotatably mount a small internal combustion engine above a working surface whereby the engine may be rotated about a fixed axis in order that various parts of the engine may be brought into position to be worked upon by a stationary workman.

Still another object of this invention, in accordance with the preceding object, is to provide an engine positioner which will enable a small internal combustion engine to be selectively rotatably mounted for movement about a selected one of a plurality of angularly disposed axes of rotation fixed relative to the internal combustion engine.

A still further object of this invention, in accordance with the preceding objects, is to provide a means for supporting a small internal combustion engine for rotation about a selected one of a plurality of angularly disposed axes of rotation fixed relative to the internal combustion engine and passing through the approximate center of gravity of the engine whereby the engine may be readily positioned about each of the angularly disposed axes of rotation and retained in that position.

Besides being difficult to perform maintenance thereon, internal combustion engines of the type utilized to power rotary lawn mowers, these internal combustion engines have their output shafts or crankshafts occasionally subjected to stresses which causes the extending portion of the crankshaft to become bent. If a relatively heavy object is struck with the spinning blade of a rotary mower, the crankshaft thereof is oftentimes bent which results in excessive vibration of the engine.

It is another object of this invention to provide an engine positioner having means thereon in the form of a thrust member which may be utilized to straighten a bent extending end of the engine crankshaft.

A further object of this invention, in accordance with the immediately preceding object, is to provide a means for indicating the amount the extended end of the crankshaft of an internal combustion engine is bent in order that it may be determined approximately how much the crankshaft end has to be bent in the opposite direction in order to return it to its original position.

Inasmuch as some internal combustion engines utilized to power rotary lawn mowers are provided with mounting flange means disposed about the sides of the housing of the engine adjacent the end thereof through which the crankshaft projects and the mounting flange means are spaced a considerable distance outwardly of the extending end of the crankshaft, when rigidly mounting the engine crankcase or housing in order to apply lateral thrust to straighten the extending end of the crankshaft, considerable stresses are brought to bear on the end of the housing through which the crankshaft projects and it is a further object of this invention to provide a means whereby an abutment surface is disposed in surface-to-surface contacting relation with the end of the housing through which the crankshaft projects in order that the lateral thrust placed on the extended end of the crankshaft will not deflect the end of the housing or the mounting flange means thereby preventing breakage of either of these parts of the engine housing. Although many types of shaft straighteners have heretofore been designed, they have not been provided with abutment means of this type to prevent breakage of the engine housing. If the crankshaft is of a relatively small diameter, an ordinary type of shaft straightener is frequently sufficient. However, other times and especially if the crankshaft has a large diameter an abutment means of this type is necessary to prevent breakage of the engine housing.

A final object to be specifically enumerated herein is to provide an engine positioner and shaft straightener which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the engine positioner and shaft straightener;

FIGURE 2 is a top plan view of the engine positioner and shaft straightener;

FIGURE 3 is a transverse sectional view of a portion of the engine positioner and shaft straightener shown with a portion of an internal combustion engine having a bent crankshaft mounted thereon and with the thrust means of the shaft straightener positioned to straighten the bent crankshaft of the internal combustion engine;

FIGURE 4 is a side elevational view of the engine positioner and shaft straightener being utilized to support a small internal combustion engine for rotation about an axis fixed relative to the internal combustion engine; and FIGURE 5 is a side elevational view of the engine positioner and shaft straightener being utilized to support the internal combustion engine for rotation about an axis at right angles to the axis of rotation of the engine as supported in FIGURE 4.

Referring now more specifically to the drawings the numeral 10 generally designates the engine positioner and shaft straightener of the instant invention which includes a mounting base generally referred to by the reference numeral 12. The mounting base 12 has a mounting face 14 against which one end 16 of an internal combustion engine housing generally referred to by the reference numeral 18 may be secured. The engine housing 18 is provided with outwardly projecting mounting flanges 20 which are disposed about the end 16 and the sides of the housing 18. The crankshaft generally referred to by the reference numeral 24 of the internal combustion engine 26 has an extending end portion 28 which is journaled through the end 16 of the housing 18 as at 30.

The mounting base 12 is provided with a plurality of bores 32 which open at one end through the mounting face 14 and are registrable with the bores 34 formed in the mounting flanges 20 of the engine 26. Fasteners 36 may be utilized to fixedly secure the engine 26 with the flanges 20 in surface-to-surface contacting relation with the mounting face 14 of the mounting base 12. The mounting base 12 has an opening 38 formed therethrough into which the outer bent end 28 of the crankshaft 24 extends. An internally threaded bore 40 is formed in the mounting base 12 and communicates with the opening 38. The bore 40 extends at right angles to the opening 38 and has a thrust member in the form of a screw 44 threadedly engaged therein.

The end face 46 of the mounting base 12 remote from the mounting face 14 thereof has a step 48 formed therein in which a deflection detection means generally referred to by the reference numeral 50 is secured. The deflection detection means 50 includes a spring arm 52 having a coil 54 formed therein and disposed about the shank 56 of a threaded fastener 58 which is engaged with a threaded bore (not shown) opening through the step 48. The arm 52 is constructed of resilient material and terminates at one end in a right angled end portion 60 disposed within the opening 38. The other end of the arm 52 terminates in a right angled end portion 62 registrable with indicia 64 carried by a deflection registering plate 66 secured to the mounting base 12. The arm 52 intermediate the end portion 62 and the coil 54 is substantially straight and lies along a chord of the cylindrical opening 38 formed in the mounting base 12 and is resiliently urged to a position intersecting the longitudinal axis of the opening 38 by means of the coil 54 disposed about the shank 56 of the fastener 58.

The end of the mounting base 12 remote from the end 46 thereof and on which the mounting face 14 is formed is provided with an abutment member 68 adapted to abut the end 16 of the housing 18.

In operation, the engine 26 is secured to the mounting face 14 by means of fasteners 36 and the abutment member 68 is disposed in tight frictional surface-to-surface abutting relation with the outer surface of the end 16 of the housing 18. The run-out or lateral deflection of the bent end 28 of the crankshaft 24 may be determined by rotating the crankshaft 24 and observing the amount of run-out indicated by the end portion 62 of the arm 52. With the crankshaft 24 positioned to indicate the maximum run-out of the crankshaft 24, the screw member 44 disposed on the other side of the opening 38 from the deflection detecting means 54 may be screwed inwardly to engage the bent end of the crankshaft 28 and to laterally deflect the bent end 28 until the bent end 28 has been straightened. It may of course take several operations to completely straighten the crankshaft 24 by means of the screw member 44.

With attention now directed to FIGURES 4 and 5 of the drawings it will be noted that the mounting base is provided with a pair of blind bores 70 and 72. The blind bore 70 opens through the end face 46 of the mounting base 12 and the blind bore 72 opens through one side of the mounting base 12 and extends at right angles to the longitudinal axis of the blind bore 70.

A mounting member 74 which is in the form of a rigid plate and is adapted to be secured to a supporting surface 76 by means of fasteners 78 and has a rod-like member or standard 80 secured thereto in any convenient manner such as by welding 82. The rod-like member 80 extends from one side of the mounting member 74 and is generally cylindrical in configuration. The free end of the rod-like member 80 may be rotatably received in either of the blind bores 70 and 72 to support the mounting base above the supporting surface 76 for rotation about a selected one of the longitudinal axes of the blind bores 70 and 72. Accordingly, with the engine 26 fixedly secured to the mounting base 12, the engine may be supported above a supporting surface for rotation about a selected one of a pair of angularly disposed axes of rotation fixed relative to the engine 26. In this manner, the engine 26 may be positioned in substantially every position necessary to provide free access to the component parts of the engine whereby the latter may have repair work readily performed thereon.

Further, and with attention directed more specifically to FIGURE 5 of the drawings, it will be noted that the spacing of the plurality of bores 32 about the periphery of the mounting base 12 may be such that the engine 26 may be mounted on the mounting base 12 in any one of a plurality of adjusted rotated positions relative to the mounting base 12. Accordingly, when the rod 80 is disposed in the blind bore 72, by selecting a given set of the bores 32 the engine 26 may be mounted for rotation about a desired axis of a plurality of axes extending at right angles ot the crankshaft 24. Therefore, not only may the engine 26 be mounted for rotation about a pair of axes established by the blind bores 70 and 72 but also about a selected one of a plurality of axes afforded by means of mounting the engine 26 in a selected one of a plurality of rotated positions relative to the mounting base 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An engine positioner and shaft straightener for an engine of the type having a housing with an output shaft having one end journaled through one end thereof and outwardly projecting mounting flange means disposed about the sides of said housing adjacent said one end thereof, said engine positioner and shaft straightener comprising a mounting base having a mounting face, means on said base adapted to rigidly secure said engine thereon with said flange means in surface-to-surface contacting relation with corresponding portions of said mounting face and the latter opposing said one end of said housing, said mounting base having an opening formed therethrough adapted to receive said output shaft, thrust means mounted on said base having an abutment member movable from one side of said opening transversely of said opening toward the other side thereof and adapted to engage said shaft and deflect the latter laterally whereby should one end of said shaft be bent it may be engaged by said abutment member and urged toward its original straight position, abutment means carried by said mounting base on said one side of said opening and inwardly of said corresponding portions of said mounting face and adapted to abut said one end of said housing adjacent said output shaft and inwardly of said mounting flange and to prevent breakage of said housing adjacent said shaft upon operation of said thrust means to straighten said shaft by preventing excess deflection of said one end and flange means of said housing, standard means, said mounting base including means for rotatably supporting said base on the upper end of said standard means for rotation about a selected one of a plurality of predetermined angularly disposed axes of rotation fixed relative to said base, two of said axes being disposed at right angles relative to each other, the lower end of said standard means including mounting means adapted for rigid support from a supporting surface, said mounting base having a plurality of angularly disposed bores formed therein comprising said rotatable supporting means, said standard means comprising a rod-like member extending upwardly from said mounting means and selectively rotatably receivable in said bores, means limiting longitudinal penetration of said rod-like member in said bores.

2. The combination of claim 1, wherein said bores are blind comprising said penetration limiting means.

References Cited in the file of this patent

UNITED STATES PATENTS

| | | |
|---|---|---|
| 1,192,267 | Bond | July 25, 1916 |
| 1,513,641 | Simmons | Oct. 28, 1924 |
| 2,310,151 | Pope | Feb. 2, 1943 |
| 3,028,905 | Dirks | Apr. 10, 1962 |

FOREIGN PATENTS

| | | |
|---|---|---|
| 5,676 | Great Britain | 1907 |